US009555759B2

(12) United States Patent
Abe et al.

(10) Patent No.: US 9,555,759 B2
(45) Date of Patent: Jan. 31, 2017

(54) KNEE PROTECTOR STRUCTURE FOR VEHICLE (71) Applicants: CALSONIC KANSEI CORPORATION, Saitama-shi, Saitama (JP); NISSAN MOTOR CO., LTD., Yokohama-shi, Kanagawa (JP)

(72) Inventors: Masato Abe, Saitama (JP); Shiro Ozawa, Kanagawa (JP)

(73) Assignees: CALSONIC KANSEI CORPORATION, Saitama-Shi (JP); NISSAN MOTOR CO., LTD., Yokohama-Shi (JP)

(*) Notice: Subject to any disclaimer, the term of this patent is extended or adjusted under 35 U.S.C. 154(b) by 0 days.

(21) Appl. No.: 15/024,103

(22) PCT Filed: Jun. 5, 2014

(86) PCT No.: PCT/JP2014/064941
§ 371 (c)(1),
(2) Date: Mar. 23, 2016

(87) PCT Pub. No.: WO2015/045492
PCT Pub. Date: Apr. 2, 2015

(65) Prior Publication Data
US 2016/0229365 A1 Aug. 11, 2016

(30) Foreign Application Priority Data
Sep. 27, 2013 (JP) ................................. 2013-201370

(51) Int. Cl.
B60R 21/045 (2006.01)
B62D 25/14 (2006.01)

(52) U.S. Cl.
CPC .......... B60R 21/045 (2013.01); B62D 25/145 (2013.01)

(58) Field of Classification Search
CPC ............................. B60R 21/045; B62D 25/145
USPC .................................................. 280/751, 752
See application file for complete search history.

(56) References Cited

U.S. PATENT DOCUMENTS

| 5,518,270 | A | * | 5/1996 | Hanada | ................. B60R 21/045 280/748 |
| 5,927,755 | A | | 7/1999 | Matsuo et al. | |
| 7,338,038 | B2 | * | 3/2008 | Maurer | ..................... F16F 7/08 267/139 |
| 2005/0052011 | A1 | * | 3/2005 | Best | ...................... B60R 21/045 280/752 |

(Continued)

FOREIGN PATENT DOCUMENTS

EP 1 837 250 A1 9/2007
EP 1 862 359 A1 12/2007

(Continued)

Primary Examiner — James English
(74) Attorney, Agent, or Firm — Foley & Lardner LLP (57) ABSTRACT A knee protector for a vehicle in which an upper bracket which generates a high reaction force to a knee input load and a lower bracket which generates a reaction force lower than the upper bracket are directly or indirectly attached, in a vertical position, to a vehicle body strength member. At least the upper bracket has a closed cross-section part on at least a part of the upper bracket. An inwardly protruding part which inwardly protrudes is formed in at least one surface of the closed cross-section part.

4 Claims, 5 Drawing Sheets (56) References Cited

U.S. PATENT DOCUMENTS

| | | | |
|---|---|---|---|
| 2007/0164548 A1* | 7/2007 | Abe | B60R 21/04 280/752 |
| 2007/0222197 A1* | 9/2007 | Makita | B60R 21/045 280/752 |
| 2008/0093831 A1* | 4/2008 | Ellison | B60R 21/045 280/752 |
| 2009/0146405 A1 | 6/2009 | Kawashima et al. | |
| 2011/0018247 A1* | 1/2011 | Misikir | B60R 21/045 280/751 |

FOREIGN PATENT DOCUMENTS

| | | |
|---|---|---|
| JP | 10-217881 A | 8/1998 |
| JP | 2000-043661 A | 2/2000 |
| JP | 2007-062542 A | 3/2007 |
| JP | 2009-040167 A | 2/2009 |
| JP | 2012-228997 A | 11/2012 |

* cited by examiner

KNEE PROTECTOR STRUCTURE FOR VEHICLE

TECHNICAL FIELD

The present invention relates to a knee protector structure for a vehicle.

BACKGROUND ART

In a vehicle such as an automobile, an instrument panel is installed on the front part in the vehicle cabin. Inside the instrument panel, there is provided a vehicle body strength member made of metal extending in nearly a vehicle width direction to connect right and left vehicle body panels.

Figure 5:
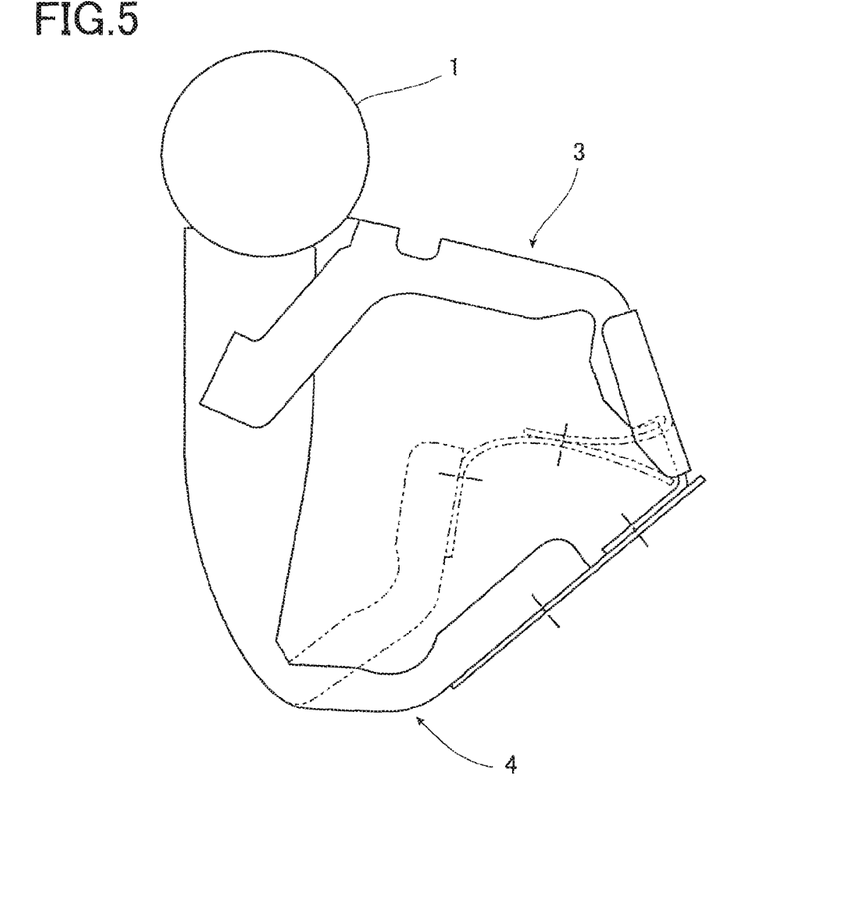
FIG. 5 is a side view of a conventional knee protector structure for a vehicle.

As shown in a side view of FIG. 5, there is known in, for example, Patent Literatures 1 and 2 a knee protector for a vehicle in which an upper bracket 3 and a lower bracket 4 are attached in a vertical position to a vehicle body strength member 1 as described above, where the upper bracket 3 generates a high reaction force to a knee input load of an occupant, and the lower bracket 4 generates a lower reaction force than the upper bracket 3.

Figure 6A:
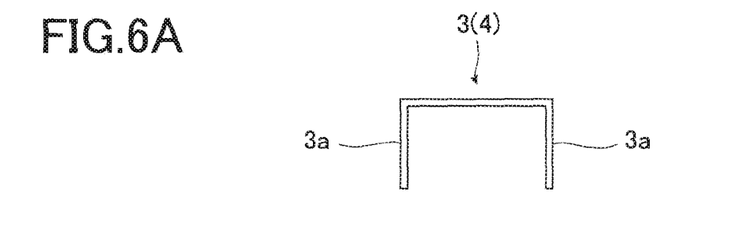
FIG. 6A is a cross-sectional view showing how the upper bracket of FIG. 5 is crushed in the early stage.

The upper bracket 3 has an open cross-section as shown in a cross-sectional view of FIG. 6A. The upper bracket 3 has, for example, a cross-section having a U-shape facing nearly downward. Further, although not specifically shown in the drawing, the lower bracket 4 has an open cross-section, similarly to the upper bracket 3. The lower bracket 4 has, for example, a cross-section having a U-shape facing nearly upward.

Figure 6B:
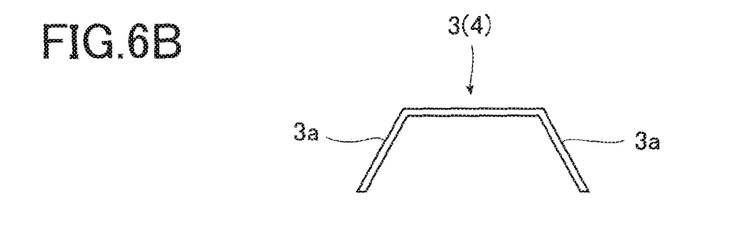
FIG. 6B is a cross-sectional view showing how the upper bracket of FIG. 5 is crushed in the middle stage.
Figure 6C:
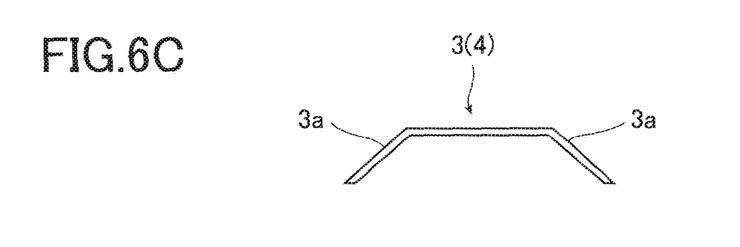
FIG. 6C is a cross-sectional view showing how the upper bracket of FIG. 5 is crushed in the late stage.
Figure 7:
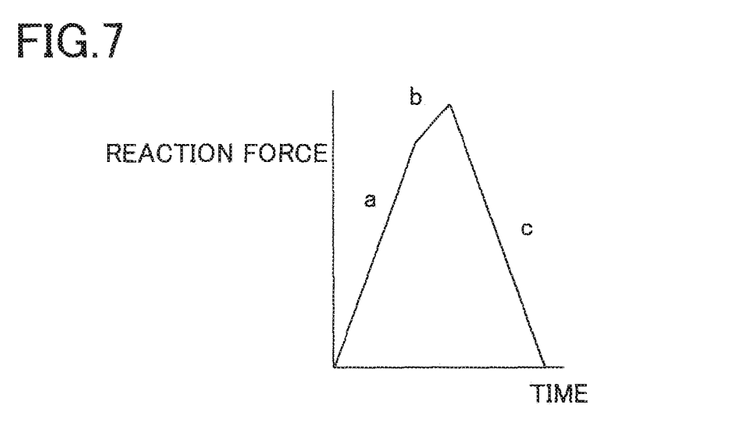
FIG. 7 is a graph showing the receiving reaction force of the upper bracket of FIG. 5, and lines a, b, and c respectively indicate the receiving reaction force in the early stage, the middle stage, and the late stage.

With the configuration as described above, a knee input load of an occupant with an average size body can be absorbed, in an emergency, mainly by deformation of both of the upper bracket 3 which generates a high reaction force and the lower bracket 4 which generates a low reaction force. Here, FIGS. 6A, 6B, and 6C respectively show how the upper bracket 3 or the lower bracket 4 deforms in an early stage, a middle stage, and a late stage. In addition, lines a, b, and c in the graph of FIG. 7 respectively show a receiving reaction force generated by the upper bracket 3 or the lower bracket 4 in the early stage, the middle stage, and the late stage.

Further, the knee input load of an occupant with a small body can be absorbed mainly by the deformation of the lower bracket 4, which generates a low reaction force.

CITATION LIST

Patent Literature

Patent Literature 1: JP 2007-62542 A
Patent Literature 2: JP 2012-228997 A

SUMMARY

Technical Problem

However, each of the upper bracket 3 and the lower bracket 4 of the above knee protector structure for a vehicle has, for example, a nearly U-shaped open cross-section. Therefore, when the upper bracket 3 and the lower bracket 4, especially, the upper bracket 3 are deformed as shown, in order, in FIGS. 6A to 6C and when U-shaped flange parts 3a on the both sides are opened to a certain extent, the flange parts 3a on the both sides are hardly opened after that. That is, the upper bracket 3 and the like cannot absorb the knee input load by opening the flange parts 3a on the both sides. Therefore, there is a problem, for example, that a load absorption amount or a reaction force to be generated decreases rapidly in the late stage as indicated by line c in FIG. 7.

In view of the above, a main object of the present invention is to solve the rapid decrease in the receiving reaction force in the late stage.

Solution to Problem

In order to solve the above problem, the present invention relates to a knee protector structure for a vehicle in which an upper bracket which generates a high reaction force to a knee input load and a lower bracket which generates a reaction force lower than the upper bracket are directly or indirectly attached, in a vertical position, to a vehicle body strength member.

At least the upper bracket has a closed cross-section part on at least a part of the upper bracket.

Further, an inwardly protruding part which inwardly protrudes is formed in at least one surface of the closed cross-section part.

Advantageous Effects

The above configuration provides the following function and effect. Specifically, at least an upper bracket has a closed cross-section part on at least a part of the upper bracket. With this arrangement, it is possible to increase a section modulus of a part on which the closed cross-section part of the upper bracket or the lower bracket is provided, so that the load absorption amount of the knee input load can be increased. Alternatively, it is possible to reduce weight by reducing a thickness of the upper bracket or the like by an amount corresponding to the increase, in the section modulus, accomplished by the closed cross-section part. In addition, because a torsional strength of the upper bracket is increased due to the increase, in the section modulus, accomplished by the closed cross-section part, even if the knee input load is uneven, the upper bracket is stably deformed. That is, the upper bracket can be crushed in a certain direction without unevenness, and the knee input load can thus be stably absorbed. In addition, an inwardly protruding part which inwardly protrudes is formed in at least one surface of the closed cross-section part. This arrangement can increase stiffness of the closed cross-section part by an amount corresponding to the provided inwardly protruding part. As a result, the receiving reaction force of the upper bracket to the knee input load can be further increased, so that the receiving reaction force can be prevented from rapidly dropping.

DESCRIPTION OF EMBODIMENT

In the following, the present embodiment and a practical example in which the present embodiment is embodied will be described in detail with reference to the drawings. FIGS. 1 to 4 show the practical example of the embodiment and a modified example of the practical example.

Example 1

In the following, a configuration will be described.

In the drawings, directions are represented by a vehicle longitudinal direction x, a vehicle width direction y, and a vertical direction z. In a vehicle such as an automobile, an instrument panel is installed on the front part in the vehicle cabin. In the instrument panel, there is provided a vehicle body strength member made of metal extending in nearly the vehicle width direction y and connecting vehicle body panels on the right and left.

Figure 1:
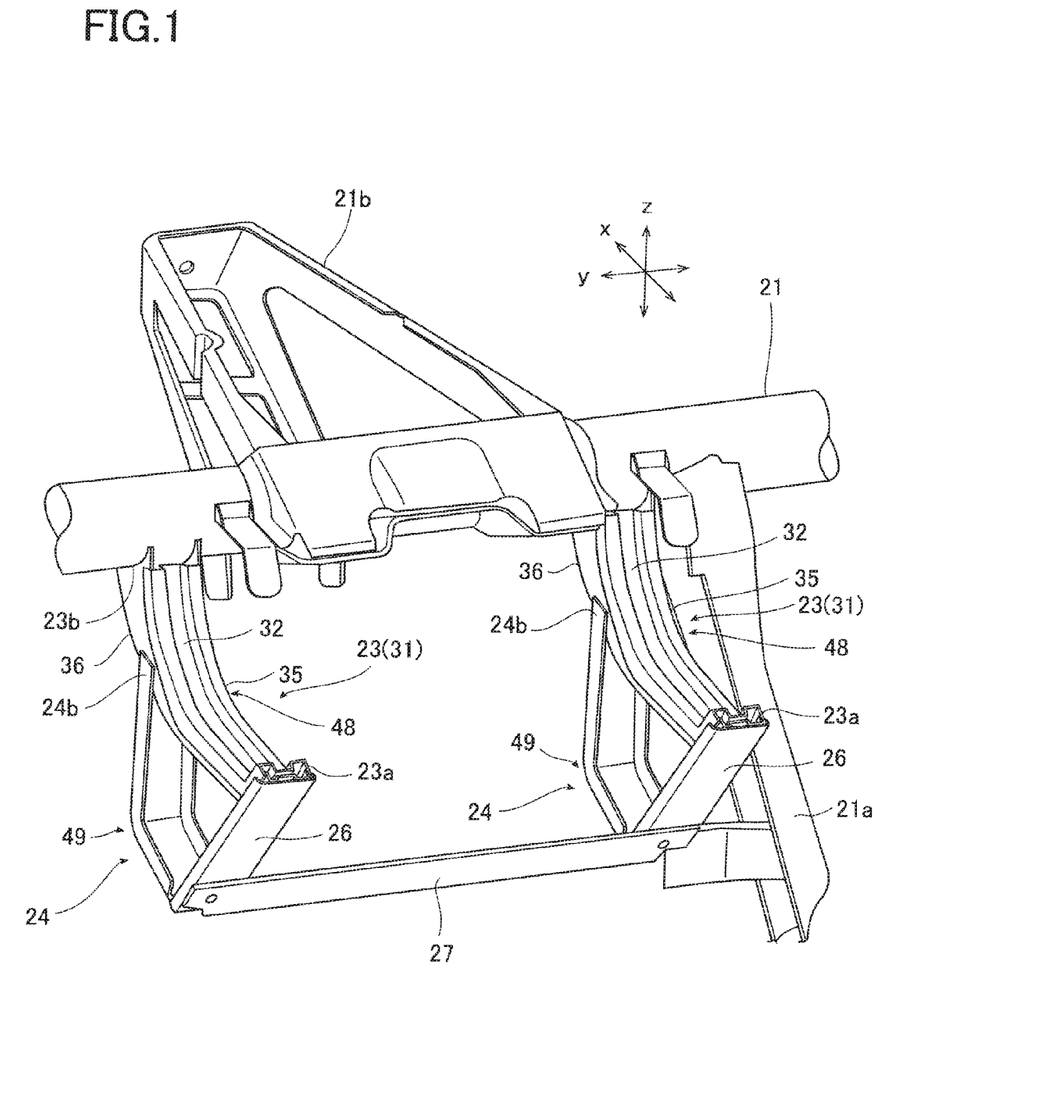
FIG. 1 is a perspective view of a knee protector structure for a vehicle according to a practical example of a present embodiment.
Figure 2:
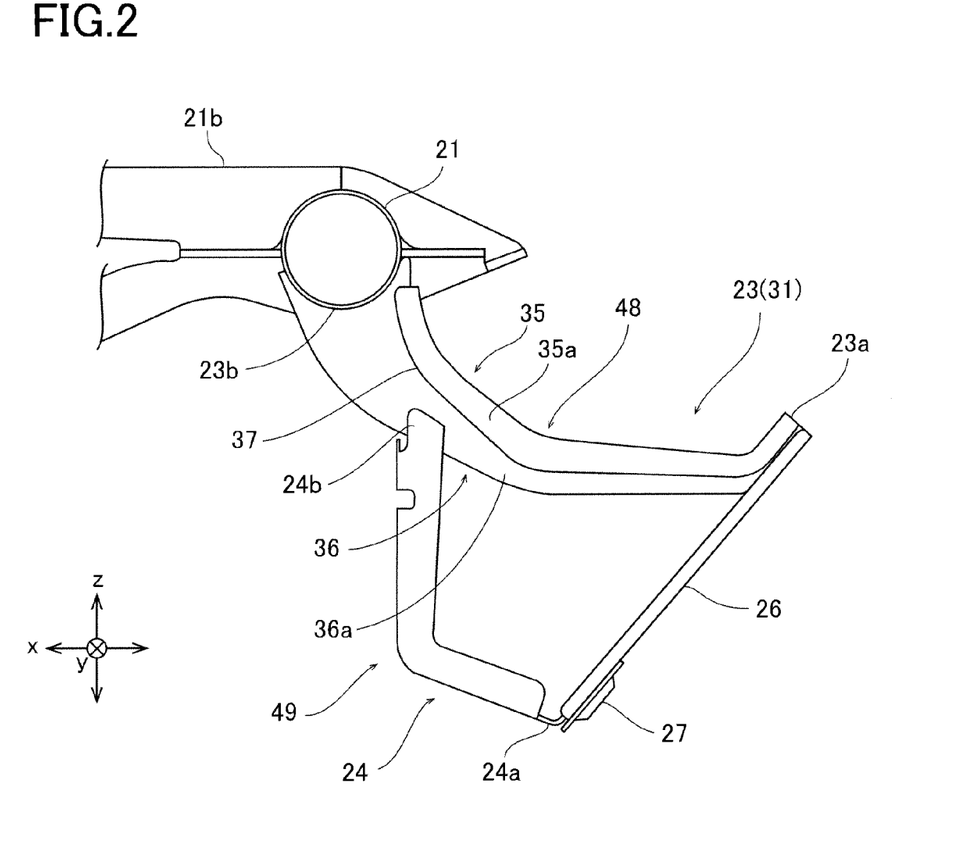
FIG. 2 is a side view of FIG. 1.

In addition, the knee protector for a vehicle of the practical example is structured, as shown in the perspective view of FIG. 1 or in the side view of FIG. 2, such that an upper bracket 23 and a lower bracket 24 are directly or indirectly attached, in a vertical position, to the above vehicle body strength member 21, where the upper bracket 23 generates a high reaction force to the knee input load of an occupant, and the lower bracket 24 generates a lower reaction force than the upper bracket 23.

Here, the structure of the above knee protector for a vehicle is literally a device or a structure provided in a vehicle to hold the knee of an occupant. The knee protector structure for a vehicle is installed in a vehicle interior panel such as an instrument panel, so as not to be seen by the occupant, on the front part of the vehicle cabin of the vehicle. In this case, the knee protector structure for a vehicle is for protecting the knee of the occupant in the driver's seat; however, the knee protector structure may also be for protecting the knee of the occupant in the front passenger's seat.

In this case, the above vehicle body strength member 21 is a strength member made of metal installed on the front part of the vehicle cabin. The vehicle body strength member 21 extends in the vehicle width direction y to connect vehicle body panels on the right and left, for example, side panels. A middle part of the vehicle body strength member 21 is held by a floor panel of the vehicle cabin through a stay 21a. The vehicle body strength member 21 is installed in the above instrument panel so as not to be seen by the occupant. The vehicle body strength member 21 supports a steering column and is thus called, for example, a steering support member in some cases, or extends in the vehicle width direction y as described above and is thus called a cross car beam in other cases. On the vehicle body strength member 21, there is provided a column bracket 21b for supporting the steering column.

Note that a main body part of the vehicle body strength member 21 extending in the vehicle width direction y is typically made of, for example, a pipe-shaped member having a circular cross-section such as an iron pipe. However, there have been also developed a vehicle body strength member which is made of a light alloy and has a cross-sectional shape other than a circular cross-section or other vehicle body strength members.

The above knee input load is generated by the occupant coming in contact with the vehicle, for example, the instrument panel when the occupant sitting on the seat is moved forward in the vehicle, in an emergency, or generated by other causes. The above reaction force is a force generated by the knee protector for a vehicle to the knee input load. The reaction force can be used to receive and absorb the knee input load.

The above upper bracket 23 is a bracket literally located on the upper side of the lower bracket 24. The upper bracket 23 is made of metal. In this case, the upper bracket 23 extends downwardly from the lower half of the vehicle body strength member 21 toward the rear side of the vehicle in a side view.

The above lower bracket 24 is a bracket literally located on the lower side of the upper bracket 23. The lower bracket 24 is made of metal. In this case, the lower bracket 24 extends downwardly from the lower part of the middle part of the upper bracket 23 toward the rear side of the vehicle in a side view.

The above expression "in a vertical position" literally means that the upper bracket 23 is located on the upper side and that the lower bracket 24 is located on the lower side.

Note that a rear end part 23a of the upper bracket 23 is located further back in the vehicle and upper than the rear end part 24a of the lower bracket 24. Further, the rear end parts 23a and 24a of the upper bracket 23 and the lower bracket 24 are integrally coupled through a vertical connecting member 26. The vertical connecting member 26 is an inclined member or the like which is inclined to be lower in the front, depending on the differences between the positions, of the rear end part 23a of the upper bracket 23 and the rear end part 24a of the lower bracket 24, in the vehicle longitudinal direction x and the vertical direction z. The vertical connecting member 26 is configured with a metal member or the like elongated in the vertical direction z.

In this arrangement, an attachment part is provided on each of the rear end part 23a of the upper bracket 23 and the rear end part 24a of the lower bracket 24 to attach an upper end part and a lower end part of the vertical connecting member 26. These attachment parts are formed to be bent in the same angle as the inclination angle of the vertical connecting member 26.

Further, a pair of the upper bracket 23 and the lower bracket 24 is provided in each of the right side and the left side, corresponding to the right and left knees of an occupant. In addition, a lateral connecting member 27 extending in nearly the vehicle width direction y connects between at least the lower end parts of the right and left vertical connecting members 26. The lateral connecting member 27 is configured with a metal plate member or the like elongated in the vehicle width direction y. Note that the vertical connecting member 26 and the lateral connecting member 27 may be integrally formed.

The above expression "directly or indirectly" literally means that the upper bracket 23 is directly attached or indirectly attached to the vehicle body strength member 21. Alternatively, the expression means that the lower bracket 24 is directly attached or indirectly attached to the vehicle body strength member 21.

In this case, the upper bracket 23 is directly attached to the vehicle body strength member 21, and the lower bracket 24 is indirectly attached to the vehicle body strength member 21 through the upper bracket 23. The arrangement, in which the lower bracket 24 is attached to the upper bracket 23 in the above manner, is more advantageous in strength than an arrangement in which the upper bracket 23, which generates a higher reaction force, is attached to the lower bracket 24, which generates a lower reaction force.

However, there is also an arrangement in which the lower bracket 24 is directly attached to the vehicle body strength member 21 and the upper bracket 23 is attached to the lower bracket 24 as shown in FIG. 5. Alternatively, there is also an arrangement in which the upper bracket 23 is indirectly attached to the vehicle body strength member 21 through the lower bracket 24. In this case, as a countermeasure, the strength of the lower bracket 24 is increased between two parts, on one of which the lower bracket 24 is attached to the vehicle body strength member 21, and on the other of which the upper bracket 23 is attached to the lower bracket 24.

In contrast to the above basic configuration, the configuration of the present practical example is equipped with the following configuration.

Configuration 1: As shown in the cross-sectional view of FIGS. 3A to 3C, at least the above upper bracket 23 is equipped with a closed cross-section part 31 on at least a part of the upper bracket 23. In addition, an inwardly protruding part 32 which inwardly protrudes is formed in at least one surface of the closed cross-section part 31.

Here, the above expression "at least the above upper bracket 23" means only the upper bracket 23 or both of the upper bracket 23 and the lower bracket 24. In this case, only the upper bracket 23 has a closed cross-section, and the lower bracket 24 has, for example, an open cross-section in a U-shape facing upward.

The above expression "at least a part" literally means a part of or whole of the upper bracket 23. The term "part" includes a part and a plurality of parts. In this case, nearly the entire upper bracket 23 has the closed cross-section part 31.

The above closed cross-section part 31 literally is a part having a closed cross-section. In this case, the closed cross-section part 31 is formed such that an upper member 35 having a U-shape facing downward and a lower member 36 having a U-shape facing upward are vertically fitted into each other, for example, with the upper member 35 being outside and with the lower member 36 being inside and such that lower edge parts of side surfaces 35a of the upper member 35 and side surfaces 36a of the lower member 36 are fixed by continuous welding along the entire fitting parts (weld lines 37).

However, the configuration of the closed cross-section part 31 is not limited to the above configuration, and the configuration of the closed cross-section part 31 may be configured, for example, such that a left member having a C-shape facing rightward and a right member having a C-shape facing leftward are laterally fitted into each other, for example, with the left member being outside and with the right member being inside and such that right edges of the upper and lower surfaces of the left member and the upper and lower surfaces of the right member are fixed by continuous welding along the entire fitting part. Alternatively, the closed cross-section part 31 may be formed by bending a plate member and by welding a butt line, at which the bent plate member is butted to form one body.

The above expression "at least one surface" means one or more surfaces of the closed cross-section part 31. In this case, the "at least one surface" is one surface, which is only the upper surface.

The above inwardly protruding part 32 literally is an inwardly protruding part of the closed cross-section part 31. In this case, the inwardly protruding part 32 is a bead-like or groove-like member which extends in the longitudinal direction of the upper bracket 23. In this case, the bead-like inwardly protruding part 32 is made to, for example, extend over almost the entire area, of the upper bracket 23, in the longitudinal direction. As can be seen from a shape of a tip part 32a, the bead-like inwardly protruding part 32 has nearly a U-shaped cross-section having a pair of side surface parts and a bottom surface part connecting inner edge parts of the side surface parts. The bottom surface part is parallel to an opposing surface of the closed cross-section part 31, which is in this case a lower surface of an opposing-surface-side part 42 to be described below. There is provided only one bead-like inwardly protruding part 32 in this case, but two or more bead-like inwardly protruding parts 32 may be provided.

Configuration 2. The tip part 32a of the above inwardly protruding part 32 is disposed to be separated from the opposing-surface-side part of the above closed cross-section part 31 with a separated part 41 therebetween (see FIG. 3A). Further, the separated part 41 is set to be such a gap that, at a time of absorbing the knee input load, the tip part 32a of the above inwardly protruding part 32 and the opposing-surface-side part 42 of the above closed cross-section part 31 come into contact with each other (see FIGS. 3B and 3C).

Here, the above tip part 32a of the inwardly protruding part 32 is the top of the protruding part of the inwardly protruding part 32 and, in other words, is the bottom surface part of the bead-like inwardly protruding part 32, in this case.

The above opposing-surface-side part 42 of the closed cross-section part 31 is an opposing surface which faces the inwardly protruding part 32 of the closed cross-section part 31, or is a part of the opposing surface.

Figure 3A:
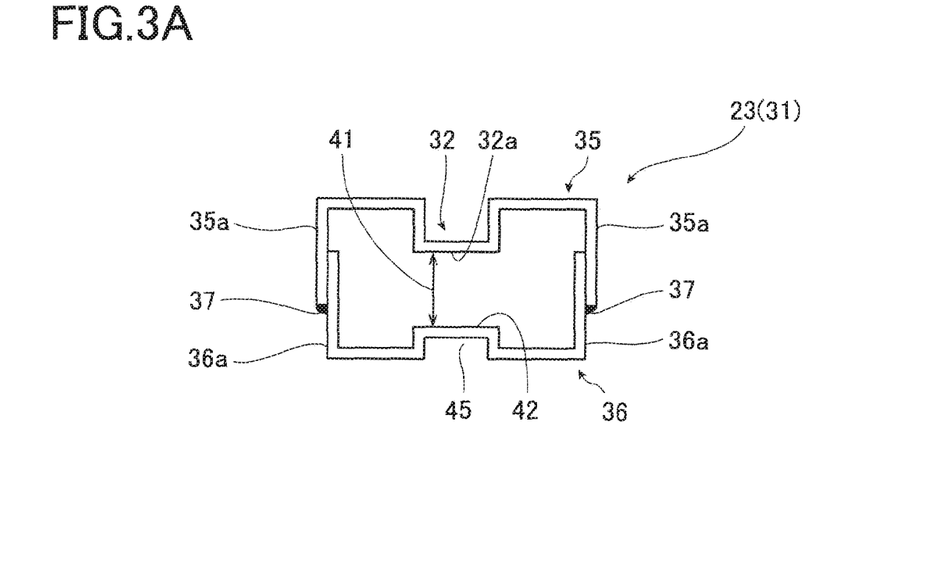
FIG. 3A is a cross-sectional view showing how the upper bracket of FIG. 1 is crushed in an early stage.
Figure 3B:
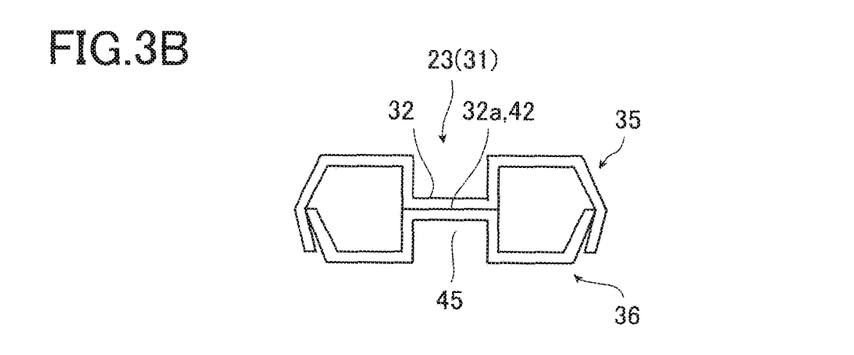
FIG. 3B is a cross-sectional view showing how the upper bracket of FIG. 1 is crushed in a middle stage.
Figure 3C:
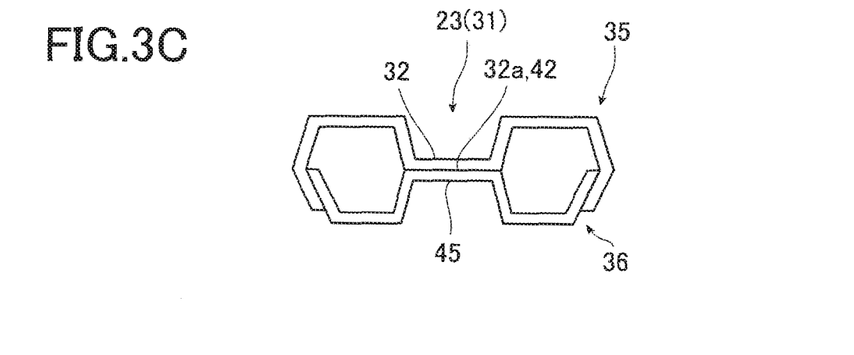
FIG. 3C is a cross-sectional view showing how the upper bracket of FIG. 1 is crushed in a late stage.

The above separated part 41 literally is a part with which the separation is established before the knee input load is absorbed (the state of FIG. 3A).

The above "a time of absorbing the knee input load" literally is a time of absorbing the knee input load, and by the absorption of the knee input load, the closed cross-section part 31 is deformed so as to be crushed.

The above "such a gap that . . . come into contact" means that the separated part 41 is set to be such a gap that, when the closed cross-section part 31 is deformed so as to be crushed by the absorption of the knee input load, the tip part 32a of the inwardly protruding part 32 and the opposing-surface-side part 42 of the closed cross-section part 31 come into contact with each other.

Configuration 3: A second inwardly protruding part 45 is provided in the opposing-surface-side part 42 of the closed cross-section part 31 to face the above inwardly protruding part 32.

Here, the above second inwardly protruding part 45 is provided so as to make a pair with the inwardly protruding part 32. The second inwardly protruding part 45 is formed to have the separated part 41 so as to come into contact with the tip part 32a of the inwardly protruding part 32 at the time of absorbing the knee input load. The second inwardly protruding part 45 may have the same cross-sectional shape as the inwardly protruding part 32 or may have a cross-sectional shape different from that of the inwardly protruding part 32. In this case, the components having the same shape are opposed with one component reversed in the opposite direction.

Configuration 4: As shown in FIG. 2, the above upper bracket 23 has at least one bent part 48 which is bent and deformed at the time of absorbing the knee input load. At least at a position of the bent part 48, the above bead-like inwardly protruding part 32 is provided, or the above bead-like inwardly protruding part 32 and the above second inwardly protruding part 45 are provided.

Here, the above bent part 48 is a start point of bending to be caused by the knee input load. If the bent part 48 has a small angle, the bent part 48 is easy to be bent and has a small load absorption amount. To the contrary, if the bent part 48 has a large angle, the bent part 48 is not easy to be bent and has a large load absorption amount. Further, if many bent parts 48 are disposed, the load absorption amount and a load absorption time can increase, but the weight is likely to increase. To the contrary, if fewer bent parts 48 are disposed, the load absorption amount and the load absorption time decrease, but the weight can be easily reduced. The above bead-like inwardly protruding part 32 and the second inwardly protruding part 45 are provided in the direction in which the bent part 48 of the upper bracket 23 is bent.

More specifically, the upper bracket 23 has a tapered shape in a side view in which the width in the vertical direction z gradually decreases from the front end part 23*b* on which the upper bracket 23 is attached to the vehicle body strength member 21 toward the rear end part 23*a* on which the upper bracket 23 is attached to the vertical connecting member 26. Further, the upper bracket 23 is approximately horizontal as a whole, but extends rearward while getting slightly lower. In addition, between the front end part 23*b* and the rear end part 23*a* of the upper bracket 23, the bent part 48 is singly provided, which is bent and deformed at the time of absorbing the knee input load. The bent part 48 has a relatively large angle close to 180°, for example, an angle not smaller than about 160°, or has a small bent shape.

In contrast, the lower bracket 24 has a nearly L-shape in a side view. Between a front end part 24*b* and the rear end part 24*a* of the lower bracket 24, a bent part 49 is singly provided, which is bent and deformed at the time of absorbing the knee input load. The bent part 49 has a relatively small angle close to 90°, for example, an angle about 110°, or has a large bent shape. Note that the front end part 24*b* of the lower bracket 24 is attached at a position further forward in the vehicle than the bent part 48 of the upper bracket 23.

The above expression "at least one" means that the upper bracket 23 may be provided with one or more bent part 48. In this case, as described above, the number of the provided bent part 48, which functions as the bending start point, is one. Note that the above description also applies to the bent part 49 of the lower bracket 24.

In the following, a function of the practical example will be described. The knee input load caused by an occupant in an emergency is transferred to the vehicle body strength member 21 through the upper bracket 23 and the lower bracket 24. At this time, the reaction force generated by the upper bracket 23 and the lower bracket 24 receives the knee input load of the occupant, and the deformation of the upper bracket 23 and the lower bracket 24 absorbs the knee input load of the occupant.

Further, the upper bracket 23 and the lower bracket 24, each of which generates a high reaction force and a low reaction force, are directly or indirectly attached, in a vertical position, to the vehicle body strength member 21. With this arrangement, the knee input load of an occupant with an average size body is absorbed by the deformation of both of the upper bracket 23 and the lower bracket 24, each of which generates a high reaction force and a low reaction force. Here, FIGS. 3A, 3B, and 3C respectively show how the upper bracket 23 or the lower bracket 24 deforms in an early stage, a middle stage, and a late stage. In addition, lines a, b, and c in the graph of FIG. 4 respectively show a receiving reaction force generated by the upper bracket 23 or the lower bracket 24 in the early stage, the middle stage, and the late stage. In addition, the knee input load of an occupant with a small size body is absorbed by the deformation of the lower bracket 24, which generates a low reaction force. This arrangement makes it possible to appropriately set the receiving reaction force and the load absorption amount for each of the knee input load of an occupant with an average size body and the knee input load of an occupant with a small size body.

The practical example provides the following advantageous effects.

Advantageous Effect 1: At least the upper bracket 23 has the closed cross-section part 31 on at least a part of the upper bracket 23. This arrangement can increase a section modulus of the part of the upper bracket 23 or the lower bracket 24, on which part the closed cross-section part 31 is provided; thus, the load absorption amount for the knee input load can be increased. Alternately, it is possible to reduce a thickness of the upper bracket 23 or the like by the amount corresponding to the increase, in the section modulus, accomplished by the closed cross-section part 31; thus, the weight can be reduced.

More specifically, for example, the side surfaces 35*a* of the upper member 35 and the side surfaces 36*a* of the lower member 36 which constitute the closed cross-section part 31 restrain each other to prevent the side surfaces from being opened so that the closed cross-section part 31 is not easily deformed; thus, a large reaction force is accordingly generated, whereby the load absorption amount is increased.

Further, because the section modulus of the closed cross-section part 31 is increased, the torsional strength of the upper bracket 23 is increased; thus, even if the knee input load is uneven, the upper bracket 23 is stably deformed. That is, the upper bracket 23 is crushed evenly in a certain direction, and the knee input load can thus be absorbed stably.

In addition, the inwardly protruding part 32 which inwardly protrudes is formed in at least one surface of the closed cross-section part 31. With this arrangement, the stiffness of the closed cross-section part 31 can be further increased by the amount corresponding to the provided inwardly protruding part 32; therefore, the receiving reaction force to the knee input load can be further increased, whereby the receiving reaction force can be prevented from rapidly dropping.

Advantageous Effect 2: The tip part 32*a* of the inwardly protruding part 32 is disposed to be separated from the opposing-surface-side part 42 of the closed cross-section part 31 with the separated part 41 therebetween. With this arrangement, the closed cross-section part 31 can be deformed by the knee input load by a space of the separated part 41. As a result, the required load absorption amount can be secured for the knee input load.

In addition, the separated part 41 is set to be such a gap that the tip part 32*a* of the above inwardly protruding part 32 and the opposing-surface-side part 42 of the above closed cross-section part 31 come into contact with each other when the knee input load is absorbed. With this arrangement, after the closed cross-section part 31 is deformed, the tip part 32a of the inwardly protruding part 32 and the opposing-surface-side part 42 of the closed cross-section part 31 come into contact with or interfere to restrain each other, so that the closed cross-section part 31 is not deformed any further, whereby the reaction force is generated, and as a result, the knee input load can continue to be absorbed.

This arrangement can prevent, for example, the load absorption amount of the knee input load from rapidly dropping after the closed cross-section part 31 is deformed; thus, the knee input load can be absorbed longer.

Advantageous Effect 3: The second inwardly protruding part 45 is provided in the opposing-surface-side part 42 of the closed cross-section part 31 to face the inwardly protruding part 32. This arrangement increases the stiffness of the closed cross-section part 31 by an amount corresponding to the provided second inwardly protruding part 45; thus, the receiving reaction force to the knee input load can be further increased to prevent the receiving reaction force from rapidly dropping.

Advantageous Effect 4: The upper bracket 23 has at least one bent part 48 which is bent and deformed at the time of absorbing the knee input load. With this arrangement, the bent part 48 functions as a start point of bending caused by the knee input load, so that the knee input load can be absorbed by the bending and deformation of the bent part 48.

In addition, at least, the bead-like inwardly protruding part 32 is provided at the position of the bent part 48, or the bead-like inwardly protruding part 32 and the second inwardly protruding part 45 are provided at the position of the bent part 48. With this arrangement, as described above, stiffness of the inwardly protruding part 32 and the second inwardly protruding part 45, the reaction force generated by the contact or interference between the inwardly protruding part 32 and the second inwardly protruding part 45, or the like can be used to prevent the receiving reaction force from rapidly dropping when the bent part 48 is bent.

Further, the bent part 48 of the upper bracket 23 has a relatively large angle close to 180°, for example, an angle not smaller than about 160°, or has a small bent shape. This arrangement can disperse the knee input load to the whole of the upper bracket 23 while preventing the bent part 48 from being quickly bent due to concentration of the knee input load on the bent part 48. Therefore, it is possible to cause the upper bracket 23 to be bent at the bent part 48 after the knee input load is received by the whole of the upper bracket 23, and the above arrangement is therefore advantageous in increasing the load absorption amount.

Figure 4:
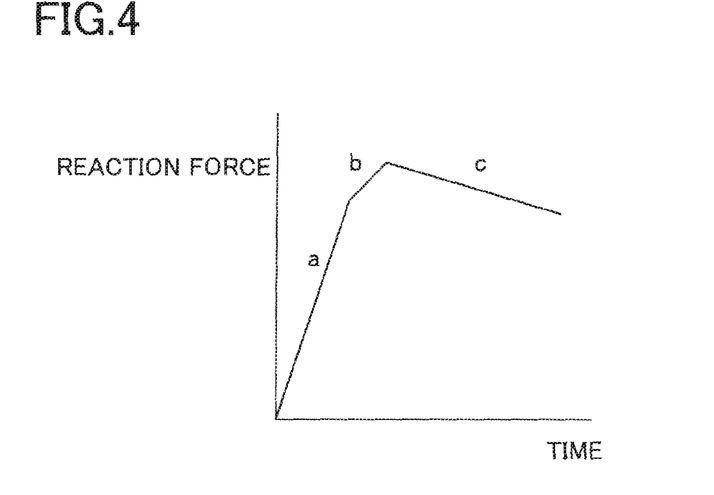
FIG. 4 is a graph showing a receiving reaction force of the upper bracket of FIG. 1, and lines a, b, and c respectively indicate the receiving reaction force in the early stage, the middle stage, and the late stage.

To summarize the above description, it is possible to effectively prevent, as represented by line c in FIG. 4, the receiving reaction force from rapidly dropping in the late stage of absorbing the knee input load by employing a plurality of the following configurations: providing the closed cross-section part 31 in the upper bracket 23; providing the inwardly protruding part 32 in the closed cross-section part 31; appropriately setting the gap between the tip part 32a of the inwardly protruding part 32 and the opposing-surface-side part 42 of the closed cross-section part 31; providing the second inwardly protruding part 45 in the closed cross-section part 31; providing the inwardly protruding part 32 and the second inwardly protruding part 45 in the bent part 48; and other configurations.

In the above, a practical example of the present embodiment is described in detail with reference to the drawings; however, the practical example is merely an example of the present embodiment. Therefore, the present embodiment is not limited to any of the configurations of the practical example, and it is a matter of course that modification of the design and the like without departing from the spirit of the present embodiment is included in the present embodiment. In addition, for example, if each practical example includes a plurality of configurations, any possible combination of those configurations is of course included in the present embodiment even if there is no specific description. Further, if a plurality of practical examples and modified examples are disclosed, any possible combination of the configurations covering those examples is of course included in the present embodiment even if there is no specific description. Further, a configuration illustrated in a drawing is of course included in the present embodiment even if there is no specific description. In addition, if the words "and/or the like" are used, those words are used to mean that the equivalent is included. In addition, if the word such as "nearly," "approximately," or "about" is used, the word is used to mean that what is within the commonsensically acceptable scope or accuracy is included in the present embodiment.

CROSS-REFERENCE TO RELATED APPLICATION

The present application claims priority from Japanese Patent Application No. 2013-201370 filed on Sep. 27, 2013, the entire contents of which are hereby completely incorporated by reference.

The invention claimed is:

1. A knee protector structure for a vehicle in which an upper bracket which generates a high reaction force to a knee input load and a lower bracket which generates a reaction force lower than the upper bracket are directly or indirectly attached, in a vertical position, to a vehicle body strength member,
   wherein at least the upper bracket has a closed cross-section part on at least a part of the upper bracket,
   an inwardly protruding part which inwardly protrudes is formed in at least one surface of the closed cross-section part,
   a tip part of the inwardly protruding part is disposed to be separated from an opposing-surface-side part of the closed cross-section part with a separated part, and
   the separated part is set to be such a gap that the tip part of the inwardly protruding part and the opposing-surface-side part of the closed cross-section part come into contact with each other when the knee input load is absorbed.

2. The knee protector structure for a vehicle according to claim 1, wherein a second inwardly protruding part is provided in the opposing-surface-side part of the closed cross-section part to face the inwardly protruding part.

3. The knee protector structure for a vehicle according to claim 1, wherein the upper bracket includes at least one bent part which is bent and deformed when absorbing the knee input load, and
   the inwardly protruding part has a bead-like shape and is provided at least at a position of the bent part.

4. The knee protector structure for a vehicle according to claim 2, wherein the upper bracket includes at least one bent part which is bent and deformed when absorbing the knee input load, and
   the inwardly protruding part has a bead-like shape and is provided at least at a position of the bent part, or the inwardly protruding part having the bead-like shape and the second inwardly protruding part are provided at least at the position of the bent part.

\* \* \* \* \*